United States Patent
Mijit et al.

(10) Patent No.: US 6,863,047 B2
(45) Date of Patent: Mar. 8, 2005

(54) METHOD OF CONTROLLING ENGINE SPEED DURING PERFORMANCE SHIFT

(75) Inventors: Kevin Mijit, West Bloomfield, MI (US); Douglas Raymond Martin, Canton, MI (US); Stephen Marc Baker, Oxford, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/624,087

(22) Filed: Jul. 21, 2003

(65) Prior Publication Data

US 2004/0069269 A1 Apr. 15, 2004

Related U.S. Application Data

(60) Provisional application No. 60/397,711, filed on Jul. 22, 2002.

(51) Int. Cl.[7] .............................. F02D 1/00; B60K 31/12
(52) U.S. Cl. ......................... 123/320; 180/172; 701/95; 477/54; 477/118
(58) Field of Search ................................. 123/320, 349, 123/350, 351; 180/172, 174; 701/95; 477/54, 91, 118

(56) References Cited

U.S. PATENT DOCUMENTS

| | | | | |
|---|---|---|---|---|
| 3,774,841 A | * | 11/1973 | Cook ......................... | 235/1 C |
| 4,953,093 A | * | 8/1990 | Etoh .......................... | 701/95 |
| 5,618,243 A | * | 4/1997 | Kondo et al. .............. | 477/118 |
| 6,269,295 B1 | * | 7/2001 | Gaugush et al. ............. | 701/95 |
| 6,370,469 B1 | * | 4/2002 | Phung et al. ............... | 180/172 |
| 6,427,108 B1 | * | 7/2002 | Kanasugi et al. ........... | 477/118 |
| 6,600,988 B1 | * | 7/2003 | Da et al. ..................... | 701/95 |
| 6,732,039 B2 | * | 5/2004 | Ino et al. ..................... | 701/95 |
| 2002/0042672 A1 | * | 4/2002 | Shiiba et al. ................ | 701/95 |
| 2003/0105573 A1 | * | 6/2003 | Ishizu et al. ................ | 701/95 |

FOREIGN PATENT DOCUMENTS

| | | |
|---|---|---|
| DE | 198 48 236 A1 | 4/2000 |
| EP | 1 155 900 A2 | 11/2001 |

OTHER PUBLICATIONS

How Cruise Control Systems Work, http://auto.howstuffworks.com/cruise–control.htm.
Cruise Control Basics, http://www.misterfixit.com/cruise1.htm.
What is PID–Tutorial Overview, http://www.expertune.com/tuitor.html.

* cited by examiner

Primary Examiner—Erick Solis

(57) ABSTRACT

A method and system of automatically controlling engine speed of a vehicle in a turn employs an engine control system (10) to determine an optimal engine speed for the turn and an actual engine speed as sensed by an engine speed sensor (38). Engine control system (10) determines the difference between optimal engine speed and actual engine speed and compares this difference to current engine load. Based on this comparison, engine control system (10) then determines whether to alter engine speed and, if so, determines an amount to reduce the difference between optimal engine speed and actual engine speed.

20 Claims, 2 Drawing Sheets

METHOD OF CONTROLLING ENGINE SPEED DURING PERFORMANCE SHIFT

CROSS REFERENCE TO RELATED APPLICATIONS

This application claims priority to U.S. Provisional Patent Application No. 60/397,711, filed on Jul. 22, 2002.

BACKGROUND OF THE INVENTION

This invention relates to a method and system for automatically controlling engine speed of a vehicle engine in a turn.

A great number of automobiles are sold with an automatic transmission. When a vehicle with such a transmission enters a turn or curve on a road, a driver of the vehicle generally takes his foot off the accelerator pedal. As a consequence, the engine speed of the vehicle is greatly reduced. When the driver leaves the turn, the driver may then accelerate the engine to thereby increase engine speed. This reduction and then subsequent increase in engine speed reduces vehicle performance due to the time delay associated with the fall and rise of engine speed.

Efforts have been undertaken to enhance vehicle performance of an automatic transmission in a vehicle turn by preventing the automatic transmission from shifting gears under certain circumstances. These efforts to enhance vehicle performance have met with some success. On the other hand, efforts to maintain engine speed in a turn have presented particular design challenges. Indeed, the automatic control of engine speed takes control of the vehicle away from the vehicle driver. Accordingly, a successful management of engine speed during a vehicle turn must accommodate the need for safe vehicle operation without driver assistance and to further account for driver input.

Moreover, there is also a need to manage the demands on the engine from an automated engine speed control with the other systems on the vehicle that require engine power. The vehicle's electrical system, air conditioning system, power steering system, mechanical and frictional loads, hydraulic pump loads and other vehicle systems may all impact engine load and consequently affect performance of the vehicle engine. Therefore, a successful engine control system must accommodate and manage all of these concerns.

A need therefore exists for a technique and system for maintaining an optimal engine speed during a vehicle turn that surmounts the foregoing design challenges.

SUMMARY OF THE INVENTION

The present invention offers both a system and technique for controlling engine speed of a vehicle engine during a vehicle turn. The engine control system includes an engine control unit in communication with several sensors. One sensor determines whether the vehicle is turning, another sensor determines actual engine speed and the other sensor monitors engine load. The engine control unit is tied to each of these sensors. This type of engine control system is conventional.

However, in contrast to existing control systems, the inventive engine control system has two types of control: an engine speed logic and engine load logic. The engine speed logic determines the optimal speed for the engine in a particular turn and compares this speed with the actual engine speed for the vehicle. The engine speed logic then determines whether a difference exists between the optimal engine speed and the actual engine speed. If there is a difference, the engine speed logic determines this difference.

In addition, the inventive engine control system has an engine load logic that communicates with the engine load sensor and compares the difference between the optimal engine speed and the actual engine speed with current engine load and load demand. Based on this comparison, the engine load logic then determines an amount to reduce the difference between the optimal engine speed and the actual engine speed. In this way, the engine speed logic is integrated with the logic governing engine load. The engine speed logic may be a proportional integral derivative controller. The engine control unit may further be in communication with a transmission control unit.

Accordingly, the inventive system senses whether a vehicle is turning. If the vehicle is turning, the system determines an optimal engine speed for the vehicle during the turn. This optimal speed is then compared to the actual engine speed to arrive at a difference between the optimal engine speed and the actual engine speed. The difference between these speeds are then compared to existing engine loads and load demand. Based upon this comparison, an amount is determined as to how much the difference between the optimal engine speed and the actual engine speed should be reduced at the particular instance.

The system then reduces the difference between the optimal engine speed and the actual engine speed by this amount. The system may then continue to track the difference between the optimal engine speed and the actual engine speed, compare this difference to the engine load and determine further amounts of engine speed reduction until the difference between the optimal engine speed and the actual engine speed reaches a particular level of difference. In addition, the actual engine speed may be maintained above this optimal engine speed by a predetermined amount so as to prevent the engine speed from dropping below a minimum level.

The difference between the actual engine speed and the optimal engine speed may be reduced by increasing or decreasing the engine speed. The engine speed of the vehicle may be altered by changing the torque output of the vehicle engine to either decrease or increase engine speed. However, to avoid unsafe driving conditions and to ensure a good ride, the inventive system may await altering the torque output until conditions are met to ensure both the safe and smooth operation of the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
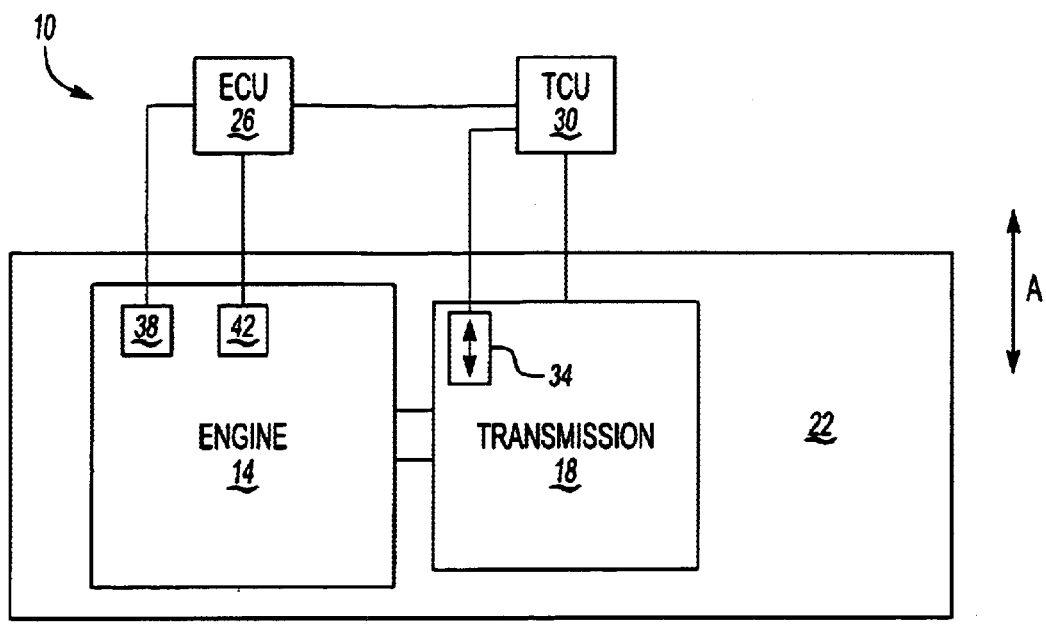
FIG. 1 illustrates a schematic view of the inventive engine control system.

FIG. 1 illustrates inventive engine control system 10 located on vehicle 22. As known, engine control system 10 controls engine 14, including engine speed. Engine control unit is further in communication with transmission control unit 30, which controls transmission 18 of vehicle 22.

Figure 2:
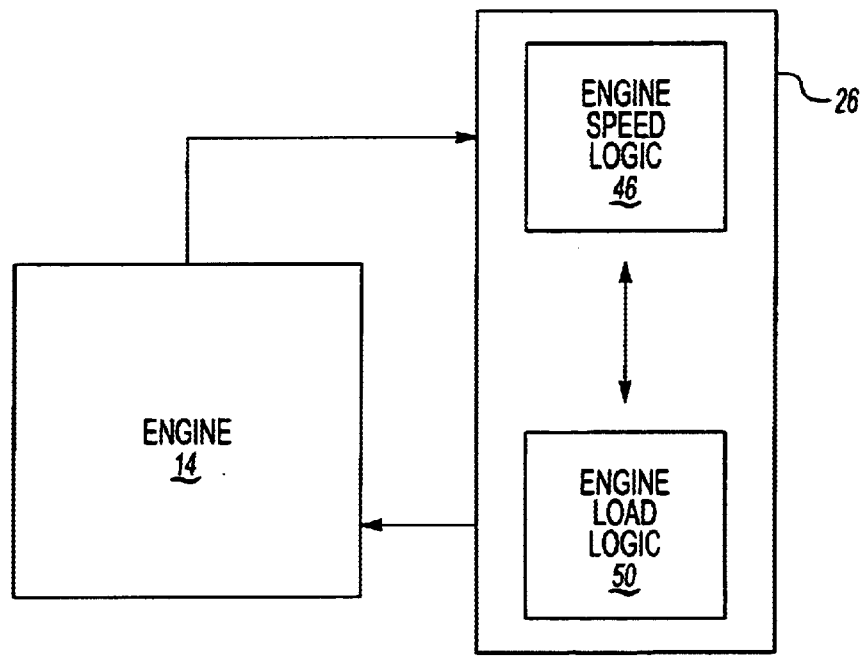
FIG. 2 illustrates another schematic view of the inventive engine control system of FIG. 1, highlighting the interplay between engine speed logic and engine load logic and the engine.
Figure 3:
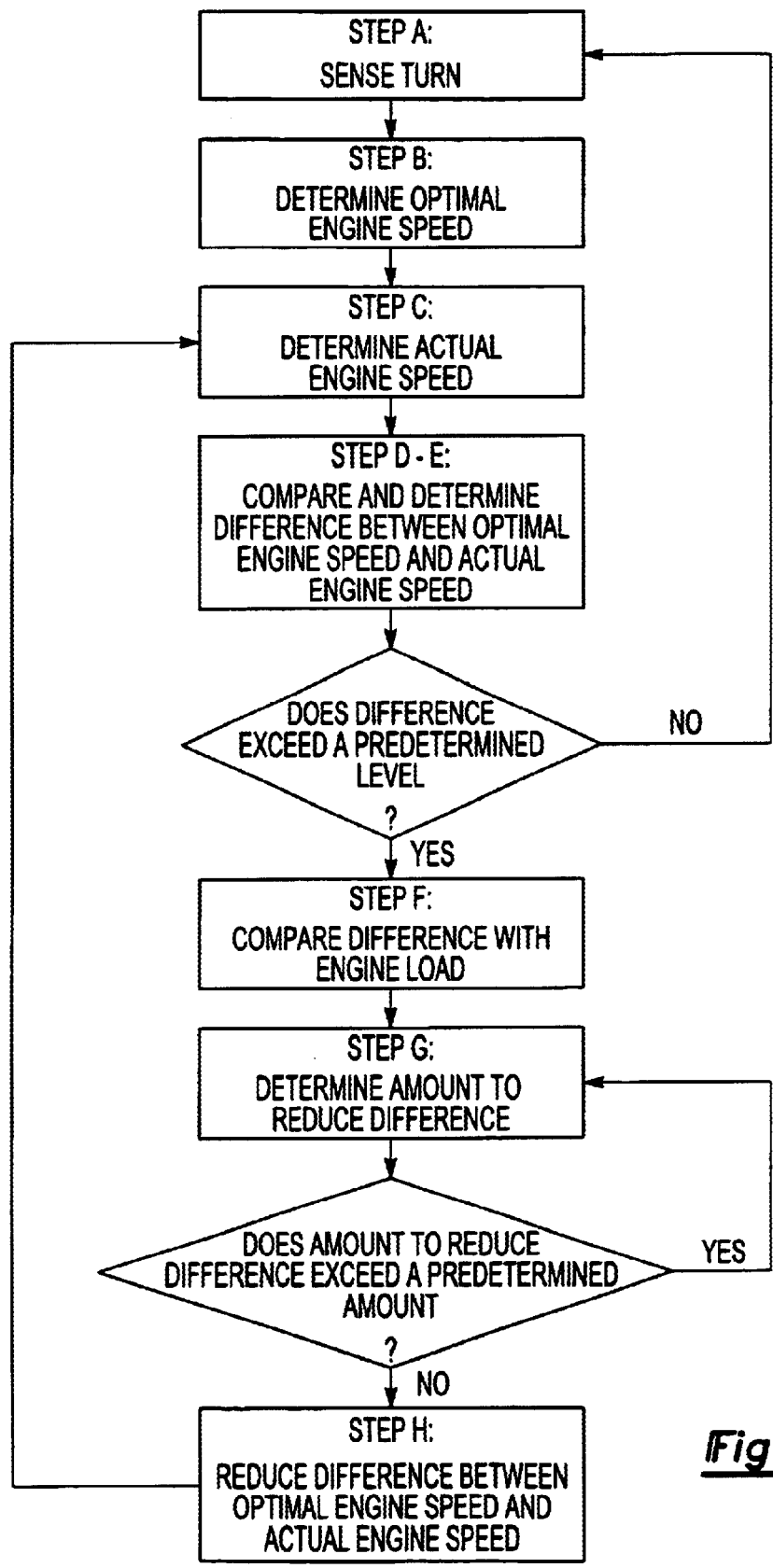
FIG. 3 illustrates a flow diagram of the logic of FIG. 2.

Engine control unit 26 receives data from engine speed sensor 38 as well as engine load sensor 42 as known. Engine control unit 26 also receives data from turning sensor 34, here an accelerometer, which determines whether vehicle 22 is in a turn, such as, judged by a lateral acceleration of vehicle 22 along axis A. In contrast to existing systems, engine control system 10 has engine speed logic 46 that interacts with engine load logic 50 as shown in FIGS. 2 and 3 to monitor and control engine 14. Referring to FIG. 3, engine speed logic 46 determines whether vehicle 22 is in a turn. If vehicle 22 is turning, engine speed logic 46 determines an optimal engine speed for vehicle 22 in the turn. It should be noted that this optimal engine speed may vary in the turn and may further vary with environmental conditions as judged by, say a traction control system. This optimal engine speed may be determined by one of ordinary skill in the art and may be available to engine speed logic 46 through mapped data. Engine speed logic 46 then determines actual engine speed and calculates the difference between the optimal engine speed and the actual engine speed. A proportional integral derivative (PID) controller may be used to monitor and calculate this difference. The PID controller will provide a scalar value, an integral value, and a derivative value of the difference.

Engine speed logic 46 then determines whether the difference between the optimal engine speed and the actual engine speed exceeds a predetermined level. This predetermined level may serve as a tolerance for the optimal engine speed so that engine control logic 46 may cease attempting to influence actual engine speed if actual engine speed is close enough to the optimal engine speed. In addition, the predetermined level may ensure that actual engine speed does not dip below a minimum engine speed, say as may be necessary to avoid engine damage or engine stall. Alternatively, there may be an engine speed maximum that prevents the engine speed from exceeding a present limit. Otherwise, engine control logic 46 outputs a difference between optimal engine speed and actual engine speed.

If the difference between the optimal engine speed and the actual engine speed is not close enough, i.e., within a predetermined level of the optimal engine speed, engine control system 10 then compares the difference between the optimal engine speed and the actual engine speed to an actual engine load or to actual load demand of engine 14. Engine 14 may be loaded by operation of an air conditioning unit, a power steering system, electrical load, mechanical and frictional loads of both the vehicle and vehicle systems, hydraulic pump loads, as well as load requirements for cruise control. In addition, during a turn, a driver may further request engine 14 to respond and thereby place additional load on engine 14. These and other known engine loads are monitored and managed by engine load logic 50. Engine control system 10 uses engine speed logic 46 and engine load logic 50 to determine an amount to reduce the difference between the optimal engine speed and the actual engine speed.

For example, if the air conditioning of vehicle 22 is operating, the amount of reduction of the difference between the optimal engine speed and the actual engine speed may be less than if the air conditioning were not running. Such engine load accommodation ensures that engine load demands will not fluctuate greatly and will further ensure smooth engine operation. In addition, if cruise control is activated or if the driver requests control of engine 14, say by accelerating or by braking, engine control system 10 may determine that there should be no reduction of the difference between optimal speed and the actual engine speed. In this way, controlling engine speed is subordinated to driver control or cruise control. One of ordinary skill in the art may accommodate the engine load demands on engine 14 so as to optimize performance while still ensuring a smooth ride. The particular performance and engine requirements will, in fact, vary with the particular vehicle and the particular driving situation. However, the interplay between the reduction between the actual engine speed and the optimal engine speed with engine load requirements is a distinct feature of this invention.

Once an amount of reduction between the optimal engine speed and the actual engine speed is determined, engine control system 10 may then determine whether the amount of reduction between the actual engine speed and the optimal engine speed exceeds a predetermined amount. That is, if the amount of reduction is significant, engine control system 10 may decide to avoid altering the difference between the optimal engine speed and the actual engine speed so as to ensure the smooth operation of engine 14. Such a situation may arise where the difference between actual engine speed and optimal engine speed is significant. Without this feature, engine control system 10 would seek to rapidly reduce the difference between the actual engine speed and the optimal engine speed, thereby causing engine 14 to rapidly change engine speed and create a jerky engine response. To avoid this problem, engine control system 10 may await a point until the amount of reduction of the difference between the actual engine speed and the optimal engine speed reaches an acceptable level. If this is the case, then engine control system 10 will command engine 14 to reduce the difference between the actual engine speed and the optimal engine speed. Because actual engine speed will generally fall in the turn without interference from engine control system 10, the amount of time before the amount of the difference between the actual engine speed and the optimal engine speed reaches this level may not be very long.

At this point, engine control system 10 may then command engine 14 to increase or decrease torque output of engine 14 based on the amount of reduction determined for the particular instance. As a safety precaution, engine control system 10 may recheck whether engine speed should be reduced at the particular point in time and recheck the steps giving rise to the torque request. For example, engine control system 10 may decide not to execute the torque request because of traction conditions as detected by a traction control system. Otherwise, engine control system 10 alters torque output. After torque output from engine 14 is altered, engine control system 10 then repeats steps C to H as indicated in FIG. 3.

In this way, engine control system 10 allows engine 14 to be controlled to maintain an optimal engine speed or close to an optimal engine speed in a vehicle turn. Engine control system 10 has features that prevent the changing of engine speed that might affect the safe operation of the vehicle or detract from its smooth operation. Accordingly, engine control system 10 accomplishes the objective of maintaining an optimal engine speed in a vehicle turn while overcoming the design challenges not solved by existing systems.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of controlling a vehicle engine, comprising the steps of:
   a) sensing a turning state of a vehicle;
   b) determining an optimal engine speed for the vehicle in the turning state;
   c) determining an actual engine speed for the vehicle in the turning state;
   d) comparing the actual engine speed with the optimal engine speed;
   e) determining whether a difference exists between the optimal engine speed and the actual engine speed;
   f) comparing the difference between the optimal engine speed and the actual engine speed with an engine load; and
   g) determining an amount to reduce the difference between the optimal engine speed and the actual engine speed based on step f).

2. The method of claim 1 including the step of
   h) reducing the difference between the optimal engine speed and the actual engine speed by the amount determined by step g).

3. The method of controlling the vehicle engine of claim 2 wherein steps c) to h) are repeated until the difference reaches a predetermined level of difference.

4. The method of claim 3 wherein the actual engine speed is prevented from achieving the optimal engine speed by a predetermined offset amount.

5. The method of claim 2 wherein step h) is performed only if the amount determined by step g) does not exceed a predetermined amount.

6. The method of claim 2 wherein step h) comprises altering the actual engine speed to reduce the difference between the actual engine speed and the optimal engine speed.

7. The method of claim 6 wherein altering the actual engine speed comprises altering a torque output of an engine of the vehicle.

8. The method of claim 7 wherein the torque output is altered based upon the amount of step g).

9. The method of claim 8 the torque output is only altered if a predetermined condition is met.

10. The method of claim 9 wherein the predetermined condition relates to a safety concern in an operation of the vehicle.

11. A method of controlling a vehicle engine, comprising the steps of:
   a) sensing a turning state of a vehicle;
   b) determining an optimal engine speed for the vehicle in the turning state;
   c) determining an actual engine speed for the vehicle in the turning state;
   d) comparing the actual engine speed with the optimal engine speed;
   e) determining whether a difference exists between the optimal engine speed and the actual engine speed;
   f) comparing the difference between the optimal engine speed and the actual engine speed with an engine load;
   g) determining an amount to reduce the difference between the optimal engine speed and the actual engine speed based on step f);
   h) reducing the difference between the optimal engine speed and the actual engine speed by the amount determined by step g) wherein step h) comprises altering the actual engine speed to reduce the difference between the actual engine speed and the optimal engine speed by altering a torque output of an engine of the vehicle.

12. The method of controlling the vehicle engine of claim 11 wherein steps c) to h) are repeated until the difference reaches a predetermined level of difference.

13. The method of claim 12 wherein the actual engine speed is prevented from achieving the optimal engine speed by a predetermined offset amount.

14. The method of claim 11 wherein step h) is performed only if the amount determined by step g) does not exceed a predetermined amount.

15. The method of claim 11 wherein the torque output is altered based upon the amount of step g).

16. The method of claim 15 the torque output is only altered if a predetermined condition is met.

17. The method of claim 16 wherein the predetermined condition relates to a safety concern in an operation of the vehicle.

18. An engine control system comprising:
   an engine control unit for a vehicle;
   a sensor for determining a turning state of the vehicle, said sensor in communication with said engine control unit;
   an engine speed sensor in communication with said engine control unit;
   an engine load sensor in communication with said engine control unit;
   an engine speed logic guiding said engine control unit and in communication with said engine speed sensor, said engine speed logic for determining an optimal engine speed for the vehicle in the turning state and for determining an actual engine speed for the vehicle in the turning state from said engine speed sensor, said engine speed logic further for comparing the actual engine speed with the optimal engine speed and for determining whether a difference exists between the optimal engine speed and the actual engine speed;
   an engine load logic in communication with said engine load sensor, said engine load logic for comparing the difference between the optimal engine speed and the actual engine speed with an engine load and for determining an amount to reduce the difference based on the engine load.

19. The engine control system of claim 18 wherein said engine speed logic is performed by a proportional integral differential controller.

20. The engine control system of claim 18 wherein said engine control unit is in communication with a transmission control unit.

* * * * *